UNITED STATES PATENT OFFICE.

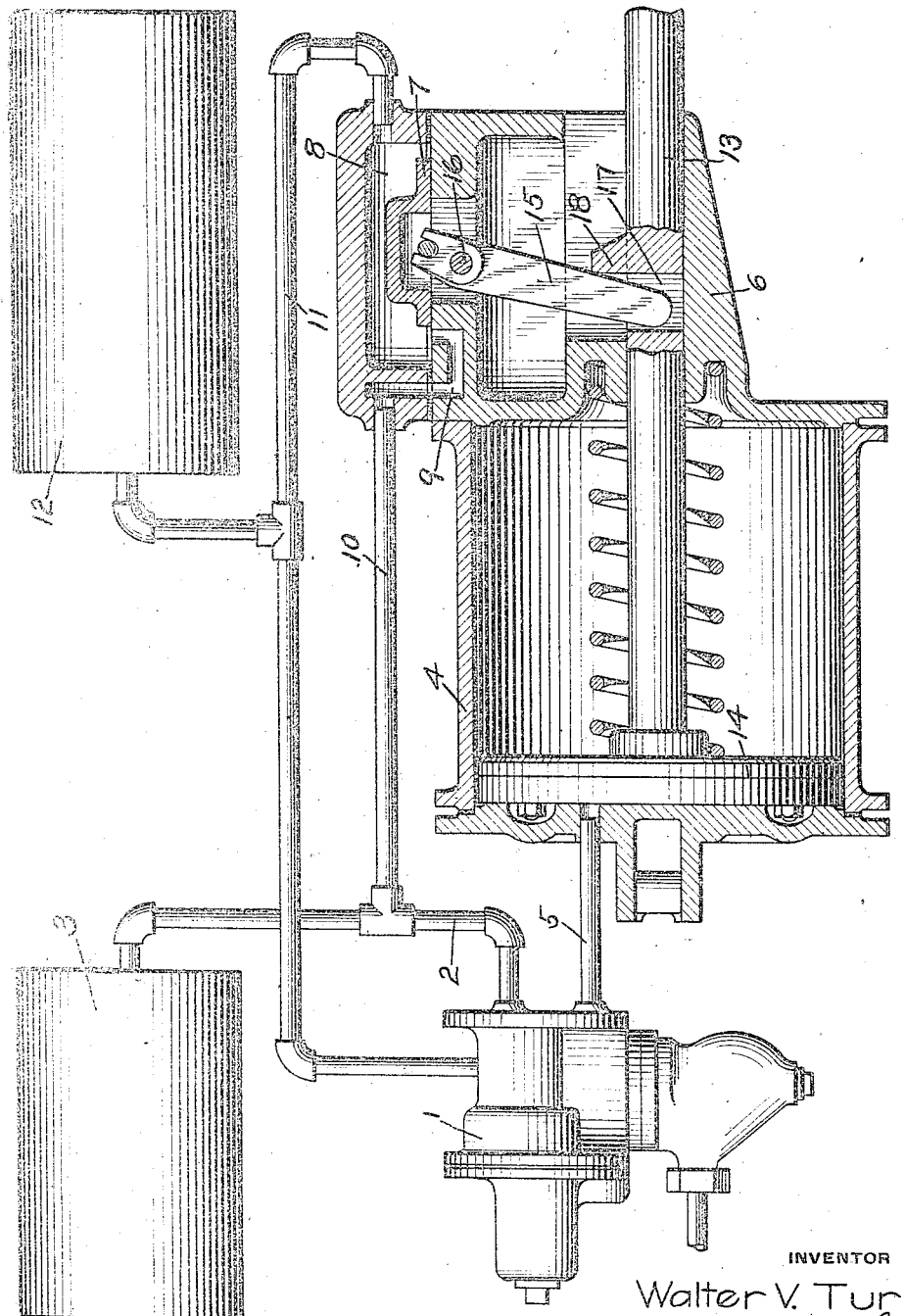

WALTER V. TURNER, OF WILKINSBURG, PENNSYLVANIA, ASSIGNOR TO THE WESTING-HOUSE AIR BRAKE COMPANY, OF WILMERDING, PENNSYLVANIA, A CORPORATION OF PENNSYLVANIA.

FLUID-PRESSURE BRAKE APPARATUS.

1,276,998.     Specification of Letters Patent.     Patented Aug. 27, 1918.

Application filed November 29, 1916. Serial No. 124,081.

*To all whom it may concern:*

Be it known that I, WALTER V. TURNER, a citizen of the United States, residing at Wilkinsburg, in the county of Allegheny and State of Pennsylvania, have invented new and useful Improvements in Fluid-Pressure Brake Apparatus, of which the following is a specification.

This invention relates to fluid pressure brakes, and more particularly to a brake equipment employing an auxiliary reservoir of small volume.

Where a small auxiliary reservoir volume is employed, it is sometimes difficult to obtain a sufficient differential pressure on the auxiliary reservoir side of the triple valve piston when a light reduction in brake pipe pressure is made, to effect the movement of the triple valve piston to application position, by reason of the triple valve piston displacement tending to increase the auxiliary reservoir volume and thus reducing the auxiliary reservoir pressure and on account of leakage from the auxiliary reservoir past the triple valve piston to the brake pipe.

The principal object of my invention is to overcome the above difficulty by providing an enlarged auxiliary reservoir volume to insure the movement of the triple valve piston to application position and then reducing the auxiliary reservoir volume to normal upon applying the brakes.

In the accompanying drawing, the single figure is a diagrammatic view, partly in section, of a fluid pressure brake apparatus, showing my improvement applied thereto.

As shown in the drawing, a triple valve device 1 of the usual construction may be provided, and connected to the triple valve device by a pipe 2, is an auxiliary reservoir 3 of small volume.

The triple valve device 1 controls the admission and release of fluid under pressure to and from a brake cylinder 4 through a pipe 5 in the usual manner.

According to a preferred form of my invention, a modified non-pressure head 6 is applied to the brake cylinder 4 and is provided with a valve seat for a slide valve 7 contained in a valve chamber 8, and adapted to control a passage 9 leading from pipe 10 and connected with auxiliary reservoir pipe 2, to said chamber.

The valve chamber 8 is connected by a pipe 11 with a normally charged supplemental reservoir 12 and the slide valve 7 is adapted to be actuated by the movement of brake cylinder piston rod 13 which is connected to the usual brake cylinder piston 14.

For this purpose, a pivoted lever 15 is provided, which is adapted to engage at one end with a pin 16 carried by the valve 7, and having the other end of the lever arranged to engage within a slot 17 provided in the piston rod 13.

When the brake cylinder piston 14 is in normal release position, the lever 15 holds the valve 7 in position uncovering passage 9, so that the auxiliary reservoir 3 is connected to the supplemental reservoir 12, and consequently, upon reducing the brake pipe pressure to effect an application of the brakes, the effective volume of the auxiliary reservoir will include the volume of the supplemental reservoir 12. By thus providing a large auxiliary reservoir volume, any leakage past the triple valve piston will have little effect in reducing the auxiliary reservoir pressure, so that movement of the triple valve piston to application position is assured.

Upon movement of the triple valve device to service application position, fluid is supplied in the usual manner from the auxiliary reservoir to the brake cylinder and the brake cylinder piston 14 is forced outwardly, causing the piston rod 13 to act on the lever 15 and thereby shift the valve 7 so as to close the passage 9.

Since the supplemental reservoir is now cut off from the auxiliary reservoir 3, the pressure obtained in the brake cylinder will correspond with the volume of the small auxiliary reservoir 3, so that the desired flexibility of brake control due to the use of a small auxiliary reservoir is retained, while the difficulties by reason of leakage around the triple valve piston are obviated.

Upon releasing the brakes, the movement of the brake cylinder piston rod 13 causes the lug 18 thereon to engage the lever 15 and shift same so as to move the valve 7 and again open the passage 9.

Having now described my invention, what I claim as new and desire to secure by Letters Patent is:—

1. In a fluid pressure brake, the combination with an auxiliary reservoir, of an additional reservoir normally connected to the auxiliary reservoir and means operated upon applying the brakes for cutting off said additional reservoir from the auxiliary reservoir.

2. In a fluid pressure brake, the combination with an auxiliary reservoir and brake cylinder, of a supplemental reservoir normally connected to the auxiliary reservoir and means operated by the movement of the brake cylinder piston in applying the brakes for cutting off communication from the supplemental reservoir to the auxiliary reservoir.

3. In a fluid pressure brake, the combination with an auxiliary reservoir, a brake cylinder containing a brake cylinder piston, and a triple valve device for supplying fluid from the auxiliary reservoir to the brake cylinder, of an additional reservoir normally connected to the auxiliary reservoir, and a valve operated by the movement of the brake cylinder piston in applying the brakes for cutting off communication from the additional reservoir to the auxiliary reservoir.

4. In a fluid pressure brake, the combination with an auxiliary reservoir and a brake cylinder containing a brake cylinder piston connected to a piston rod, of a supplemental reservoir normally connected to the auxiliary reservoir, a valve for controlling communication from the auxiliary reservoir to the additional reservoir and a lever operated by the movement of the brake cylinder piston rod for actuating said valve.

5. In a fluid pressure brake, the combination with an auxiliary reservoir and a brake cylinder, of an additional reservoir normally connected to the auxiliary reservoir and means operated upon a predetermined travel of the brake cylinder piston in applying the brakes for closing communication from the additional reservoir to the auxiliary reservoir.

In testimony whereof I hereunto set my hand.

WALTER V. TURNER.